US009723495B2

(12) United States Patent
Puthenpura et al.

(10) Patent No.: US 9,723,495 B2
(45) Date of Patent: *Aug. 1, 2017

(54) ARCHITECTURE FOR RADIO ACCESS NETWORK VIRTUALIZATION

(71) Applicant: AT&T Intellectual Property I, L.P., Atlanta, GA (US)

(72) Inventors: Sarat Puthenpura, Berkeley Heights, NJ (US); Ioannis Broustis, Millburn, NJ (US); Leonid Razoumov, Riverdale, NY (US); Eric Rozner, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,281

(22) Filed: Sep. 21, 2016

(65) Prior Publication Data

US 2017/0013473 A1   Jan. 12, 2017

Related U.S. Application Data

(63) Continuation of application No. 14/952,112, filed on Nov. 25, 2015, now Pat. No. 9,473,949, which is a
(Continued)

(51) Int. Cl.
*H04W 4/00* (2009.01)
*H04W 16/18* (2009.01)
*H04W 8/26* (2009.01)
*H04W 24/02* (2009.01)
*H04W 84/04* (2009.01)
*H04W 28/06* (2009.01)

(52) U.S. Cl.
CPC ............. *H04W 16/18* (2013.01); *H04W 8/26* (2013.01); *H04W 24/02* (2013.01); *H04W 28/065* (2013.01); *H04W 84/045* (2013.01)

(58) Field of Classification Search
CPC .................................................... H04W 72/02
USPC ......... 370/328–339, 229–238, 252–253, 415
See application file for complete search history.

(56) References Cited

U.S. PATENT DOCUMENTS 7,724,707 B2   5/2010 Foster et al.
8,423,069 B2   4/2013 Qiu
(Continued)

OTHER PUBLICATIONS

Acampora et al. "An Architecture and Methodology for Mobile-Executed Handoff in Cellular ATM Networks." IEEE Journal on Selected Areas in Communications, vol. 12. No. 8. Oct. 1994, pp. 1365-1375.
(Continued)

Primary Examiner — Iqbal Zaidi
(74) Attorney, Agent, or Firm — Amin, Turocy & Watson, LLP

(57) ABSTRACT

Multiple access wireless communication networks/infrastructures are virtualized in telecommunications environments. A system replicates a cell identifier associated with a macro base station device to create a virtual base station device presence for a set of network devices included in the multiple access wireless communication network and thereafter facilitates communication with the multiple access wireless communication network, the set of network devices, and a mobile device through the created virtual base station presence.

20 Claims, 15 Drawing Sheets

Related U.S. Application Data continuation of application No. 14/060,470, filed on Oct. 22, 2013, now Pat. No. 9,232,387.

(56) References Cited

U.S. PATENT DOCUMENTS

| | | | |
|---|---|---|---|
| 8,428,607 | B2 | 4/2013 | Nan |
| 8,428,610 | B2 | 4/2013 | Chowdhury et al. |
| 8,472,983 | B1 | 6/2013 | Kapoor et al. |
| 8,493,898 | B2 | 7/2013 | Billau et al. |
| 2009/0196245 | A1 | 8/2009 | Ji |
| 2010/0135206 | A1 | 6/2010 | Cherian et al. |
| 2010/0197309 | A1* | 8/2010 | Fang ............... H04W 36/04 455/436 |
| 2010/0322227 | A1 | 12/2010 | Luo |
| 2010/0323714 | A1 | 12/2010 | Schmidt et al. |
| 2011/0223918 | A1 | 9/2011 | Dahlen et al. |
| 2011/0244851 | A1 | 10/2011 | Gunnarsson et al. |
| 2011/0255486 | A1 | 10/2011 | Luo et al. |
| 2013/0083783 | A1 | 4/2013 | Gupta et al. |
| 2013/0115951 | A1 | 5/2013 | Deng et al. |
| 2013/0148502 | A1 | 6/2013 | Yang et al. |
| 2015/0003263 | A1 | 1/2015 | Senarath et al. |

OTHER PUBLICATIONS

Naranjo et al. "A Dynamic Spectrum Access Scheme for an LTE-Advanced HetNet with Carrier Aggregation." SCC 2013, Jan. 21-24, 2013 in Munich, Germany, 6 pages.

Wang et al. "Mobility Management Schemes at Radio Network Layer for L TE Femtocells." IEEE 69th Vehicular Technology Conference, Apr. 26-29, 2009, 5 pages.

Final Office Action for U.S. Appl. No. 14/060,470 dated May 6, 2015, 34 pages.

Office Action for U.S. Appl. No. 14/952,112 dated Feb. 24, 2016, 25 pages.

* cited by examiner

ARCHITECTURE FOR RADIO ACCESS NETWORK VIRTUALIZATION

RELATED APPLICATION

The present application is a continuation of, and claims priority to each of, U.S. patent application Ser. No. 14/952,112, filed Nov. 25, 2015, and entitled "ARCHITECTURE FOR RADIO ACCESS NETWORK VIRTUALIZATION," which is a continuation of U.S. patent application Ser. No. 14/060,470 (now U.S. Pat. No. 9,232,387), filed Oct. 22, 2013, and entitled "ARCHITECTURE FOR RADIO ACCESS NETWORK VIRTUALIZATION," the entire contents of which applications are hereby incorporated herein by reference.

TECHNICAL FIELD

The disclosed subject matter relates to radio access network (RAN) virtualization, e.g., an architecture for virtualizing or abstracting multiple access wireless communication networks/infrastructures.

BACKGROUND

The widespread proliferation of small cell deployments in high-speed cellular networks introduces unprecedented management, configuration and monitoring, but also operation challenges to mobile network operators. Small cells can be deployed in areas of poor macro-cellular coverage, as well as in areas where there is increased bandwidth demand, such as in public hotspots and enterprise environments. With this, heterogenous deployments (so-called "HetNets") comprising cells with diverse power levels are formed, wherein small-cells transmit data at lower transmission power values than macro cells, while they may reuse the frequency spectrum that is currently assigned to macro base stations.

In this context, the explosion in the number of deployed long term evolution (LTE) small cell base stations comes with additional requirements for creating a large number of interfaces between the newly deployed small cells and the backhaul infrastructure. In addition, such deployments exacerbate the interference levels experienced by each mobile device, due to the sharing of the common spectrum between small cells and macro cells. Frequent handoffs from macro cell to small cells, and back as, well as between small cells pose additional challenges in resource management.

DETAILED DESCRIPTION

Figure 1:
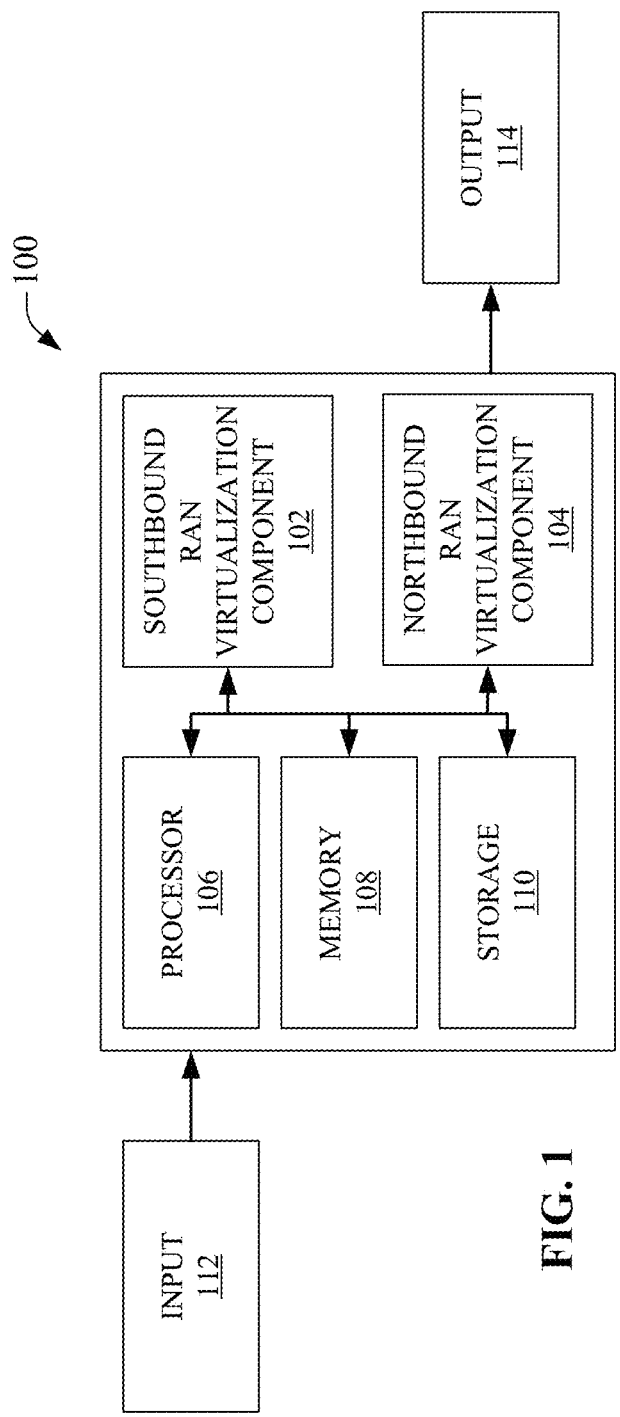
FIG. 1 is an illustration of an illustrative system for virtualizing or abstracting multiple access wireless communication networks/infrastructures in telecommunications environments in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The subject application discloses a heterogeneous virtual radio access network (HVRAN) architecture, which seeks to simplify small cell network operations and deployment procedures. The disclosed architecture virtualizes small cell base stations in such a way that a wireless user terminal (e.g., user equipment (UE) units, mobile devices, access terminals, subscriber stations, etc.) as well as backhaul network infrastructure entities view the radio access network as a unified ecosystem, wherein a macro cell and its associated (e.g., communicatively coupled) small cells that are deployed within the macro cell's coverage area all form a group that virtualized (abstracted or perceivable) as a single consolidated radio access network entity.

The following disclosed and described heterogeneous virtual radio access network enhances the architectural properties of today's long term evolution deployments, for instance. Accordingly, as a preface to the described and disclosed heterogeneous virtual radio access network, an introductory discussion on a standardized long term evolution architecture is presented below.

Long term evolution infrastructures are typically deployed on top of other already functional (older) cellular network technologies (e.g., High Speed Packet Access (HSPA) and Global System for Mobile (GSM)), and/or interact with them via 3rd Generation Partnership Project (3GPP) based standardized interfaces. Generally a long term evolution deployment consists of evolved Node B (eNodeB) stations, which are connected to a long term evolution evolved packet core (EPC) (e.g., the long term evolution backhaul), and, e.g., to serving gateways (SGWs) for purposes of traffic delivery and to mobility management entities (MMEs) for management and control of associated user equipment (UE) units/terminals.

In this context, long term evolution terminals (namely, user equipment units/terminals, access terminals, subscriber stations, etc.) are connected to the infrastructure via wireless attachment procedures to eNodeB stations. Due to potentially significant path-loss and/or interference levels, wireless operators have recently been enhancing their long term evolution deployments with small cells (e.g., low power eNodeB stations) that are deployed in areas where macro-cell coverage is poor due to increased path loss, and/or there is increased bandwidth demand by long term evolution user equipment devices (e.g., mobile devices, smart phones, cellular devices, laptops, handheld devices, tablet computers, notebook computers, wired and/or wireless devices with associated processors, storage peripherals, and/or memories, desktop computers, personal digital assistants (PDAs), and the like). As a result, in many cases, small cells (e.g., micro-cells, femto cells, pico-cells, enterprise femto-cells, etc.) are likely to be deployed within the coverage range of macro cells.

Under the foregoing scenario therefore, it can be typical for a macro cell to schedule transmission(s) toward associated user equipment unit(s) at the same time that a small cell schedules transmission(s) to its associated user equipment unit(s). Given that two transmissions are scheduled contemporaneously or in near contemporaneity user equipment associated with the macro cell and user equipment associated with the small cell are highly likely to experience significant levels of interference (e.g. Signal to Interference plus Noise Ratio (SINR) and both the network performance of the user equipment associated with a macro cell and the network performance of the user equipment associated with the small cell will be significantly degraded due to the concurrent transmissions from the macro cell that the small cell. This is partly because, in long term evolution radio access network deployments, eNodeB stations (e.g. macro cells and/or small cells) typically do not synchronize their transmissions. Each base station (e.g., macro cell and/or small cell) therefore schedules its associated user equipment units/terminals independently and relies on physical (PHY) layer techniques as well as self optimization networking (SON) algorithms/processes to mitigate interference. Nonetheless, due to the extreme population densities of small cells and the limited bandwidth resources, it can be difficult to alleviate the impact of co-channel interference.

As has been enunciated above, the purpose for deploying small cells is twofold: (i) to fill macro cell coverage holes that are typically created in urban environments (e.g., due to physical obstacles such as buildings) as well as due to long-term changes in the environment, and (ii) to increase user throughput in certain hotspot areas (e.g., corporate environments, hospitals, university campuses, airports, etc.), where there is increased user traffic demand, either via increase of SINR or offloading of the macro cell. In either of these two cases, the deployment of a new small cell directly implies that new interfaces need to be established for communication between the newly placed base station (eNodeB station) and the evolved packet core; specifically new small cell to user equipment and small cell to mobility management entity interfaces need to be activated for communication with the serving gateway (SGW) and mobility management entity (MME) respectively, as well as potentially one or more X2 interfaces for communication with neighbor base station nodes (eNodeB nodes).

To provide an idea of the magnitude of the foregoing issue, consider that based on typical rough estimates for urban deployments, there is an expectation that 10 small cells will be deployed on average within the coverage range of each macro base station device. This suggests that each mobility management entity would have to support a tenfold increase in small cell to mobility management entity interfaces.

At this juncture it should be noted that current mobility management entity products are typically designed to support up to 200 eNodeB to mobility management entity interfaces (e.g., communicate with up to 200 eNodeB stations on a regular basis). A tenfold increase in the number of deployed cells within a mobility management entity's control implies that the average mobility management entity would have to support 2000 such interfaces. Additionally, mobile devices (e.g., user equipment) would have to perform frequent handoff operations while moving from the coverage area of a first small cell to the coverage area of a second small cell; this significantly increases mobility management entity signaling overhead even further.

In view of the foregoing using today's long term evolution architectural design, this issue can be overcome in either of the following two ways: (i) an increased number of mobility management entities and/or (ii) use of small cell gateways. In the case of the former, an operator could deploy more mobility management entities (e.g., 10 times more mobility management entities would need to be placed within the same area) in order to compensate with an increased non-access stratum (NAS) signaling demand. Nevertheless, this can be cost prohibitive since it would involve the establishment of 10 times more mobility management entity to home subscriber server (HSS) interfaces, thereby tremendously increasing the security implications of the latter (given the importance of the home subscriber server; it can be a requirement that the number of home subscriber server interfaces to other evolved packet core entities remains small). In the case of the latter (e.g., using small cell gateways), instead of increasing the number of mobility management entities, a local gateway could alternatively be used. For instance, small cells can be treated in a similar way as home base stations (e.g., HeNB entities), which can be connected to local home base station gateways (e.g., HeNB-GW), which partially offload the mobility management entity from excessive non-access stratum signaling load. However, the network operator would again have to monitor and manage many more evolved packet core equipment (since approximately 10 times as many local home base station gateways would be deployed). Small cell gateways would nevertheless have to be much more robust and resilient to failures than a local home base station gateway, given the tremendous operational (and thereby financial) significance of indoor/outdoor small cells (recall that today the use of home base stations is not extensive and therefore it is not a significant source of revenue for mobile operators; thus commercially available local home base station gateways today are cheap and not so resilient). Therefore, in both of these approaches considerable financial and network management costs and complexity are introduced. Similar observations can also be made for other evolved packet core network elements, such as serving gateways.

The aforementioned observations suggest that the long-term evolution architectural decisions that have been standardized in the past should be enhanced with new intelligence, in order to be conducive to the deployment of heterogeneous networks. This conclusion serves as a motivation for the subject application.

The core notion underpinning the subject application is based on the following considerations: the deployment of one or more small cells within the macro cell coverage area should incur minimal operational, financial, management, and maintenance complexities for both the network operator and the user. Neither the user equipment unit side nor the evolved packet core performance should be negatively affected by the aggressive deployment of small cells. The disclosure addresses these considerations by virtualizing the existence of small cells, such that both the evolved packet core and user equipment units continue identifying a single radio access network level point of contact per macro cell instance, as with today's deployments. With the disclosed and described heterogeneous virtual radio access network (HVRAN) architecture, each deployed small cell is seamlessly integrated within an existing macro cell deployment. As a result, the radio access network still consists of the same cell identities with which it was represented prior to the small cell placement. This becomes possible by virtualizing small cells and macro cells into a unified cell-like environment.

The subject disclosure in order to facilitate and satisfy the foregoing core notion and/or motivation therefore changes the radio access network by ensuring, from the perspective of user equipment units extant within the coverage areas of small cell eNodeB stations and/or macro-cell eNodeB stations, that small cell eNodeB stations are indistinguishable from macro-cell eNodeB stations. For example, each small cell eNodeB station can be thought of as a virtualized clone of the macro eNodeB station. To accomplish this, each small cell eNodeB station has the same public cell ID (identity) as the macro eNodeB station and hence, each user equipment unit extant within the ambit of the small cell eNodeB stations and/or macro cell eNodeB stations detects the presence of a single cell (e.g. at least across the coverage range of the macro cell). Such a small cell eNodeB station can be referred to as a virtual eNodeB station (V-eNodeB). Hence, user equipment units detect the same set of cell identities as the ones that it would have detected prior to the deployment or introduction of the small cell eNodeB station.

Further, each virtual eNodeB station performs baseband signal processing locally in the same way as already standardized by the 3rd Generation Partnership Project (3GPP) technical standards. Partial/full protocol data unit (PDU) decoding information and data can be conveyed to peer virtual eNode stations/nodes or to a southbound radio access network virtualization agent or component (explicated below) for further processing and scheduling decision making procedures. Note here that in the case where virtual eNodeB units are enhanced with Remote Radio Heads (RRH), baseband processing is performed by each virtual eNodeB, wherein RRH connections are terminated.

Virtual eNodeB stations/nodes can distinguish each other via the use of locally maintained individual identities (called L-IDs). It should be appreciated that while such (unique) identities are used among the virtual eNodeB stations/nodes (as well as by the macro cell eNodeB station), these identities are not exposed over the air interface to the extant user equipment units, and are not propagated to the mobility management entity or the serving gateway. A locally maintained individual identity can be a media access control (MAC) address of any of the virtual eNodeB stations/nodes' physical network interfaces, a virtual eNodeB station/node's private internet protocol (IP) address, a virtual eNodeB station/node's manufacturer serial number, and/or other pre-provisioned (or temporarily assigned) identities. Among other aspects of the radio resource management, a locally maintained individual identity can be used to facilitate advanced charging and traffic metering for packets passing via macro cells and small cells.

Virtual eNodeB stations can leverage an enhanced X2 communication interface for the purposes of distributed synchronization and other radio resource control related information. Since user equipment units only detect a single ID, all virtual eNodeB stations/nodes need to synchronize their transmissions towards the various different extant user equipment units within the range of the various virtual eNodeB stations and/or macro eNodeB nodes/stations, in order to cause minimal or no interference. This is possible via the use of a commonly maintained scheduler mapping table for the utilization of common physical resource blocks (PRBs), as opposed to independently maintaining such tables by each eNodeB station as is the current situation.

Communication amongst virtual eNodeB stations/nodes as well as between virtual eNodeB stations/nodes and macro eNodeB stations (for the purpose of synchronization and exchange of various control/traffic related information) can be either fully distributed (via the point-to-point enhanced X2 interfaces mentioned above), and/or via a software utility called a southbound radio access network virtualization agent/component (SRVA). Such a southbound radio access network virtualization agent/component can play the role of a virtual eNodeB station coordination point which: (1) groups virtual eNodeB stations according to their common cell ID—all the virtual eNodeB stations that use the same cell ID can be members of the same group, and are identified by their locally maintained individual identities (L-IDs); (2) collects and distributes radio access network level transmission synchronization timing and parameters, as well as radio access network level quality of service (QoS) requirements for the different extant user equipment units to the virtual eNodeB stations/nodes; (3) interfaces with the macro eNodeB station(s) for alignment with virtual eNodeB stations; (4) performs management and maintenance of virtual eNodeB stations, by distributing software updates, operating system images and system configuration parameters, executes self organized networking (SON) algorithms/processes for radio access network level parameterization of the virtual eNodeB stations as well as of macro eNodeB stations/nodes; (5) in the presence of one or more independent self organized networking servers, the southbound radio access network virtualization agent/component can interface with each self organized networking server for the purposes of self organized networking based configuration decisions and distribution of commands/parameters from the self organized networking server to virtual eNodeB stations; (6) performs coordination among virtual eNodeB stations regarding the adaptive use of different wireless technologies in parallel, such as long term evolution (LTE), Wi-Fi, etc., in such a way that user equipment units only see a single network identifier (e.g., access point name (APN)) across the different technologies—such coordination can include the dynamic use of available spectrum across the available technologies; (7) assists virtual eNodeB stations in performing seamless inter-virtual eNodeB station handoff for each associated user equipment unit, and optionally reports handoff related information to a northbound radio access network virtualization agent/component (NRVA). With this, user equipment units do not realize and are unaware that they are being handed off from one virtual eNodeB station to the next virtual eNodeB station. Furthermore, this allows opportunistic scheduling in the network and minimizes handoff overhead on both the air interface and backend signaling.

While the southbound radio access network virtualization agent/component can be a separate entity, it is also possible for one of the virtual eNodeB stations and/or one of the macro eNodeB stations to undertake the responsibility of performing the functionalities associated with the southbound radio access network virtualization agent/components. It should be noted that the southbound radio access network virtualization agent/component can leverage either the (enhanced) X2 interfaces for communication with the macro eNodeB station or other proprietary or standardized interfaces, or a combination of them. Additionally, it should also be noted that a single southbound radio access network virtualization agent/component can manage multiple groups of virtual eNodeB stations, wherein each group can be identified by its own cell ID.

To further facilitate and satisfy the above noted core notion, the disclosed and described subject application, it should be noted, does not introduce any procedural changes to the evolved packet core part of the network. For example, evolved packet core network elements operate in concert and comply with the 3rd Generation Partnership Project (3GPP) technical standards. This conformity with technical standards prescribed by the 3rd Generation Partnership Project (3GPP) is accomplished by use of a north bound radio access network virtualization agent/component (NRVA). The northbound radio access network virtualization agent/component is a utility that operates as a translator to the evolved packet core and to the radio access network. It abstracts the radio access network to the evolved packet core and maps evolved packet core originated commands to specific virtual eNodeB nodes. For example, the northbound radio access network virtualization agent/component performs the following tasks. The northbound radio access network virtualization agent/component interfaces with the mobility management entity on behalf of each assigned virtual eNodeB station for paging purposes. Specifically, the northbound radio access network virtualization agent/component is responsible for delivering paging requests to the appropriate virtual eNodeB station, by maintaining a local map between cell-ID and locally maintained individual identities (L-IDs). Moreover, the northbound radio access network virtualization agent/component responds to the mobility management entity's paging requests based on paging responses that it receives from the radio access network. This may take place via packet de-capsulation: the northbound radio access network virtualization agent de-capsulates the paging response header from the paging response packet sent by a responding virtual eNodeB station, and replaces it with a header containing the identity of the group within which the virtual eNodeB station belongs (e.g., the corresponding macro eNodeB stations cell-ID). Alternatively, the responding virtual eNodeB station may directly use the cell-ID information when constructing the response.

The northbound radio access network virtualization agent/component also maintains local information regarding the whereabouts of user equipment units that are associated with virtual eNodeB nodes. Specifically, the northbound radio access network virtualization agent/component does not share with the mobility management entity any information regarding any inter-virtual eNodeB node handover procedures. As far as the mobility management entity is concerned, a user equipment unit is associated with/to a specific cell-ID; the mobility management entity does not know the specific identity of the virtual eNodeB station(s) that serve(s) a particular user equipment unit. This information can be maintained by the northbound radio access network virtualization agent/component. When the mobility management entity wishes to know the location (in terms of the attached cell) of the user equipment unit, it can send a paging request, which can be handled by the northbound radio access network virtualization agent/component in the following manner. If the northbound radio access network virtualization agent/component locally maintains information regarding the whereabouts of user equipment units, then it can replace the cell ID in the packet header (e.g., for packets that originate from the mobility management entity) with a specific locally maintained individual identity, and forward that packet to the corresponding virtual eNodeB unit, which will further convey it to the targeted user equipment unit via the paging channel. Examples of such packets include paging requests and authentication and key agreement (AKA) requests/confirmations. If the northbound radio access network virtualization agent/component does not maintain local information regarding the whereabouts of user equipment units, the northbound radio access network virtualization agent/component can multicast the mobility management entity's query to all virtual eNodeB stations of the group, as well as to the macro eNodeB station.

The northbound radio access network virtualization agent/component can also perform the same packet processing operations (as with paging above) for all related communication between each virtual eNodeB station and mobility management entity, as well as between each virtual eNodeB station/node and the serving gateway.

Additionally and/or alternatively, the northbound radio access network virtualization agent/component can play the role of the security gateway, thereby establishing internet protocol security (IPsec) tunnels between each virtual eNodeB station and the southbound radio access network virtualization agent/component, in which case the southbound radio access network virtualization agent/component and the northbound radio access network virtualization agent/component should establish an individual internet protocol security tunnel. Other means of security association between the southbound radio access network virtualization agent/component and the northbound radio access network virtualization agent/component can include pre-provisioned key material based mutual authentication, certificate-based protocols, identity-based authenticated key agreement, etc.

In the presence of the southbound radio access network virtualization agent/component, all evolved packet core related information is exchanged between the southbound radio access network virtualization agent/component and the northbound radio access network virtualization agent/component. Depending on the implementation, the two agents/components (e.g., southbound radio access network virtualization agent/component and northbound radio access network virtualization agent/component) can coexist within the same physical server, or exist in separate servers. It is also possible to implement both the southbound radio access network virtualization agent/component and the northbound radio access network virtualization agent/component within the same entity. Moreover, each of the two agents/components can be part of the macro eNodeB station implementation.

Similarly, as with the southbound radio access network virtualization agent/component, the northbound radio access network virtualization agent/component can be an independent entity. It is also possible for one of the virtual eNodeB stations or the macro eNodeB station to take the responsibility to perform the northbound radio access network virtualization agent/component role. Furthermore, the northbound radio access network virtualization agent/component can leverage a small cell to mobility management entity interface for communication with the southbound radio access net work virtualization agent/component, or other proprietary or standardized interfaces. It should be appreciated that a single southbound radio access network virtualization agent/component can manage multiple groups of virtual eNodeB stations, with each group identified by its own cell ID.

In accordance with the foregoing, the subject application in an embodiment can include a system that comprises a memory to store executable instructions, and a processor configured to facilitate execution of the instructions to perform operations. The operations can include receiving a cell identifier associated with a macro base station device, replicating the cell identifier to create presence data representing of associated with a first virtual base station device presence/object for a set of network devices associated with a radio access network; and facilitating communication between the set of network devices and a mobile device through the first virtual base station device presence and based on the presence data.

The described operations can also include maintaining a data structure of identities to distinguish the first virtual base station device presence/object represented by the presence data from a second virtual base station device presence/object represented by other presence data, wherein the data structure of identities comprises a media access control address of a network interface associated with the first virtual base station device presence/object, and grouping the first virtual base station device presence/object with a second base station device presence/object as a function of the cell identifier.

Additionally, the operations performed by the system can also include initiating the sending of and/or distributing radio access network level transmission synchronization timing and/or parameters to the first virtual base station device presence/object, initiating the sending of and/or distributing radio access network level quality of service requirements for the mobile device to the first virtual base station device presence/object, initiating the sending of and/or distributing software updates to the first virtual base station device presence/object, and initiating the sending of and/or distributing operating system images and system configuration parameters to the first virtual base station device presence/object.

Moreover, additional operations that can be performed by the described system can include executing a self organized networking algorithm/process for a radio access network level parameterization of the first virtual base station device presence/object, and coordinating a use of different or disparate wireless technologies between the first virtual base station device presence/object and a second virtual base station device presence/object to ensure that the mobile device perceives and/or associates with a single network identifier.

In accordance with a further embodiment the subject application can include a method that performs acts such as replicating a cell identifier associated with a macro base station device to create an identity associated with virtual base station device presence/instance for a set of network devices included in a multi-access communication system, and using the identity associated with the virtual base station device instance, facilitating communication between a device of the multi-access communication system and a user equipment device associated with the set of network devices.

Additional acts that can be performed by the method can include delivering a paging request received from a mobility management entity device to the virtual base station device presence/instance as a function of a data structure of identities, replying to a paging request received from a mobility management entity device as function of a paging response received from the multi-access communication system, and replacing a header included in the paging response with a header that includes the identity associated with the virtual base station device presence/instance as a function of receiving a paging response from the multi-access communication system.

In still yet a further embodiment, the subject disclosure describes a computer readable medium and/or a computer readable storage device comprising instructions that, in response to execution, cause a computing system that includes a processor to perform operations. The operations can include creating an instance of a base station device (e.g., a virtual base station device presence) for a set of network devices associated with a radio access network as a function of duplicating a cell identifier associated with a macro base station device included in the set of network devices, and facilitating communication between a mobile device and the set of network devices through and/or via the instance of the base station device.

Further operations can include maintaining a data structure of identities that comprises a media access control address of a network interface associated with one device included in the instance of the base station, disseminating and/or sending radio access network level transmission synchronization timing and/or radio access network level transmission synchronization parameters to the instance of the base station device, disseminating and/or sending radio access network level quality of service requirements for the mobile device to the instance of the base station device, distributing software updates to the base station device, executing a self organized networking algorithm and/or process for a radio access network parameterization of the base station device, and delivering a paging request received from a mobility management entity device to the base station device based on a data structure of identities that distinguishes the base station device from a second base station device.

Turning now to the figures, wherein FIG. 1 illustrates a system 100 that can have been deployed or located within a multiple access communication infrastructure, such as a radio access network, cellular network, wireless communication network, and the like, wherein the multiple access communication infrastructure can comprise and/or include wired and/or wireless aspects, such as mobile switching centers, base station controllers, base station transceiver stations, gateway mobile switching centers, and user equipment units dispersed throughout the multiple access communication infrastructure, and the like. System 100 can, for example, be situated within the multiple access communication infrastructure such that it is in operative communication with one or more mobility management entity that in turn can be in communication with one or more serving gateway and/or one or more home subscriber server. As will be appreciated by those of ordinary skill in the art, the one or more serving gateway can also be in communication with packet data network gateways that can provide access to public switched telephone networks, integrated services digital networks, and/or public data networks.

System 100 can change the multiple access communication architecture/infrastructure by ensuring, from the perspective of user equipment units extant within the coverage area of small cell eNodeB stations and/or macro cell eNodeB stations, that small cell eNodeB stations are indistinguishable from macro cell eNodeB stations. For instance, system 100 ensures that each small cell eNodeB station within the coverage area of a macro cell eNodeB can be perceived of as a virtualized clone of the macro eNodeB station. To accomplish this, system 100 ensures that each small cell eNodeB station has the same cell ID (identity) as the macro cell eNodeB station, and hence each user equipment unit extant within the ambit of the small cell eNodeB station and/or macro cell eNodeB stations detects the presence of a single cell ID (e.g., at least across the coverage range of the macro cell eNodeB station). Thus, through use of the facilities provided by system 100 small cell eNodeB stations can be referred to as a virtual eNodeB station (V-eNodeB station). User equipment units within the ambit of the virtual eNodeB station therefore detect the same set of cell identities as the ones that it would have detected prior to deployment or introduction of the small cell eNodeB station into the networking environment.

Moreover, through the use of the facilities provided by system 100 each virtual eNodeB station can perform baseband signal processing locally in the same way as already standardized in the 3rd generation partnership project (3GPP) technical standards. Partial/full protocol data unit (PDU) decoding information and data can be conveyed to peer virtual eNodeB stations or to a southbound radio access network (RAN) virtualization agent/component 102 for further processing and scheduling decision making procedures.

Additionally, the virtual eNodeB stations constructed by system 100 can distinguish each other via the use of locally maintained individual identities (L-IDs). In this context, it should be appreciated that such unique identities are used among the virtual eNodeB stations (as well as by the macro cell eNodeB station); these locally maintained individual are not exposed over the air interface to the extant user equipment units (e.g., user equipment units operational within the coverage area of the macro cell eNodeB station and introduced or deployed small cell eNodeB station(s)), and are not propagated to the mobility management entity or the serving gateway. In order to facilitate this aspect, system 100 can fabricate a locally maintained individual identity for the virtual eNodeB station through use of a media access control (MAC) address of any of the virtual eNodeB station's physical network interfaces, the virtual eNodeB station's private Internet protocol (IP) address, the virtual eNodeB station's manufacturer serial number, and/or other pre-provisioned (or temporarily assigned) identities associated with the virtual eNodeB station. Among other aspects of the radio resource management, the locally maintained individual identity can be used by system 100 to facilitate advance billing and traffic metering for packets passing via macro cell eNodeB and/or small cell eNodeB stations.

Further, through the facilities provided by system 100, constructed virtual eNodeB stations can leverage enhanced X2 communication interfaces for the purposes of distributed synchronization and other radio resource control related information. Since user equipment units typically only detect a single cell ID, all virtual eNodeB stations need to synchronize their transmissions towards the different user equipment units, in order to cause minimal or no interference. This is possible via the use of a commonly maintained scheduler mapping table for the utilization of common physical resource blocks (PRBs).

Furthermore, system 100 ensures that communication amongst virtual eNodeB stations as well as between virtual eNodeB stations and macro eNodeB stations (e.g., for purposes of synchronization and exchange of various control/traffic related information) is either fully distributed (e.g., via a point-to-point enhanced X2 interface) or provided by southbound radio access network virtualization component 102, wherein the southbound radio access network virtualization component 102 can act as a virtual eNodeB coordination point. In furtherance of this coordination point aspect, system 100 through use of southbound radio access network virtualization component 102 can group virtual eNodeB stations according to a common cell ID; all virtual eNodeB stations that use the same cell ID can belong to a same grouping and are identified by their locally maintained individual identities (e.g., L-IDs).

System 100 in conjunction with southbound radio access network virtualization component 102 and in accordance with the foregoing coordination aspect can also collect and distribute radio access network level transmission synchronization timing and parameters, as well as radio access network level quality of service requirements for disparate user equipment unit to virtual eNodeB station communications. System 100, once again in concert with southbound radio access network virtualization component 102, can perform management and maintenance tasks for the virtual eNodeB stations by initiating the sending, distributing, or disseminating of software updates, operating system images and system configuration parameters. Further, system 100 and southbound radio access network virtualization component 102 can execute self organized network algorithms and/or processes for radio access network level parameterization of virtual eNodeB stations as well as macro eNodeB station. It should be noted that in the presence of one or more independent self organized networking servers, the southbound radio access network virtualization component 102 can interface with each of the one or more independent self organized networking servers for the purposes of self organized networking based configuration decisions.

System 100 in addition to the foregoing can, in collaboration with southbound radio access network virtualization component 102, also perform coordination among virtual eNodeB stations regarding the adaptive use of different wireless technologies in parallel in such a way that user equipment units see or perceive a single network identifier, such as an access point name, across the different wireless technologies. Such coordination includes the dynamic use of available spectrum across the available technologies.

Moreover, system 100, once again in conjunction with southbound radio access network virtualization component 102 can assist virtual eNodeB stations in performing seamless inter virtual eNodeB station handoff for each associated user equipment unit within the ambit of respective virtual eNodeB stations. Further, system 100 in concert with southbound radio access network virtualization component 102 can report handoff related information to northbound radio access network virtualization component 104. In accordance with this aspect, a user equipment unit is unaware that it is being handed off from one virtual eNodeB station to the next virtual eNodeB station. Furthermore, the foregoing facility allows for opportunistic scheduling in the network and minimizes handoff overhead on both the air interface and backend signaling.

As has been noted above, system 100 does not introduce any procedural changes to the evolved packet core part of the network. For example, system 100 ensures that all evolved packet core network elements operate in accordance with principles set out in the 3rd Generation Partnership Project technical standards. In order to ensure adherence to these technical standards, system 100 in collaboration with northbound radio access network virtualization component 104 operates as a translator to the evolved packet core as well as to the radio access network. The northbound radio access network virtualization component 104 abstracts the radio access network for purposes of the evolved packet core and maps evolved packet core originated commands to specific virtual eNodeB stations. For instance, system 100, through the aegis of northbound radio access network virtualization component 104 interfaces with the mobility management entity on behalf of each assigned virtual eNodeB station for purposes of paging. Specifically, system 100 comprising northbound radio access net work virtualization component 104 is responsible for delivering paging requests to the appropriate virtual eNodeB station, by maintaining a local map between locally maintained individual identities (L-IDs) and cell IDs. Moreover, system 100, in conjunction with northbound radio access network virtualization component 104, responds to a mobility management entity's paging requests based at least on paging responses that are received from the radio access network. This may take place via packet decapsulation—wherein system 100 (e.g., northbound radio access network virtualization component 104) de-capsulates the paging response header from the paging response packet sent via a responding virtual eNodeB station, and replaces it with a header containing the identity of the group within which the virtual eNodeB station belongs (e.g., the corresponding macro eNodeB stations cell ID). Additionally and/or alternatively, a responding virtual eNodeB station can directly use the cell ID (e.g., the cell ID of the macro eNodeB station) information when constructing a response.

System 100, once again in conjunction with northbound radio access network virtualization component 104, maintains local information regarding the whereabouts of user equipment units that are associated with virtual eNodeB nodes. Specifically, system 100 and northbound radio access network virtualization component 104 do not share with the mobility management entity any information regarding any inter-virtual eNodeB station handover procedures. As far as the mobility management entity is concerned, a user equipment unit is associated with/to a specific cell ID; the mobility management entity does not know the specific identity of the virtual eNodeB station(s) that serve(s) a particular user equipment unit. This information can be maintained by system 100 comprising northbound radio access network virtualization component 104. When the mobility management entity wishes to know the location (in terms of the attached cell) of the user equipment, it can dispatch a paging request, which can be handled by system 100 (e.g., by northbound radio access network visualization component 104) in the following manner. Where system 100 locally maintains information regarding the whereabouts of user equipment units, then it can replace the cell ID in the packet header (e.g. for packets that originate from the mobility management entity) with a specific locally maintained individual identity. Examples of such packets include paging requests and authentication and key agreement (AKA) requests/confirmations. Where system 100 does not maintain local information regarding the whereabouts of user equipment units, system 100 can multicast the mobility management entity's query to all virtual eNodeB stations of the group, as well as to the macro eNodeB station.

System 100 comprising radio access network virtualization component 104 can also perform the same packet processing operations (as with paging noted above) for all related communication between each virtual eNodeB station and mobility management entity, as well as between each virtual eNodeB station and the serving gateway.

Additionally and/or alternatively, system 100, through northbound radio access network virtualization component 104, can play the role of a security gateway, thereby establishing internet protocol security (IPsec) tunnels between each virtual eNodeB station and the southbound radio access network virtualization agent component 102.

Moreover, as illustrated in FIG. 1, in addition of southbound radio access network virtualization component 102 and northbound radio access network virtualization component 104, system 100 can include processor 106, memory 108, and storage 110. As depicted, southbound radio access network virtualization component 102 and northbound radio access network virtualization component 104 can be in communication with processor 106 for facilitating operation of computer executable instructions and components by southbound radio access network virtualization component 102 and northbound radio access network virtualization component 104, memory 108 for storing computer executable components and instructions, and storage 110 for providing longer term storage of data and/or computer executable components and instructions. Additionally, system 100 can receive input 112 for use, manipulation, and/or transformation by southbound radio access network virtualization component 102 and/or northbound radio access network virtualization component 104. Further system 100 can also produce and output a useful, concrete, and tangible result as output 114.

Figure 2:
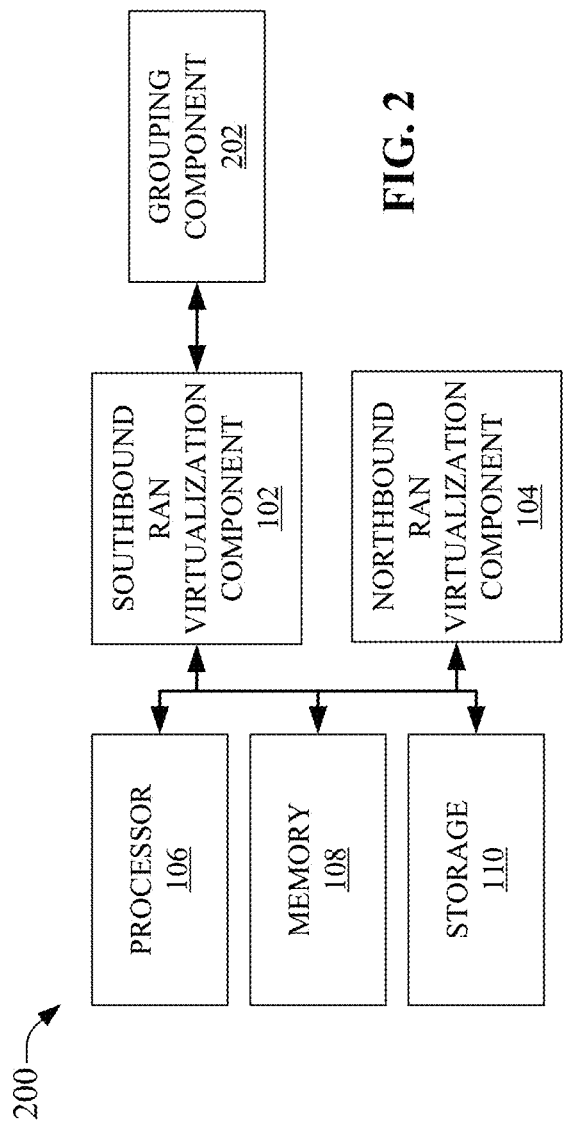
FIG. 2 is a further depiction of a system for virtualizing or abstracting multiple access wireless communication networks/infrastructures in telecommunications environments in accordance with aspects of the subject disclosure.

FIG. 2 illustrates system 100 in further detail 200. As depicted in FIG. 2 system 100 as described above can include southbound radio access network virtualization component 102 and northbound radio access network virtualization component 104, wherein both southbound radio access network virtualization component 102 and northbound radio access network virtualization component 104 can be in operable communication with processor 106 that can facilitate operation and/or execution of computer executable instructions and/or components for southbound radio access network virtualization component 102 and northbound radio access network virtualization component 104. Additionally, as depicted system 100 can also include memory 108 for storing computer executable components and/or instructions, and storage 110 for providing longer term storage of data, instructions, and/or computer executable components. Also as depicted in FIG. 2 southbound radio access network virtualization component 102 can be in communication with grouping component 202 that can group virtual eNodeB stations in accordance with their common cell-ID; all virtual eNodeB stations/nodes that use the same cell ID can be members of the same group, and are identified within the group by their locally maintained individual identities (e.g., any one of the media access control address of any physical network interface associated with any virtual eNodeB station included in the group, a private internet protocol address associated with a virtual eNodeB station included in the group, a manufactured serial number associated with any virtual eNodeB station included in the group, or any other pre-provisioned (or temporarily assigned) identities associated with any virtual eNodeB station included in the group).

Figure 3:
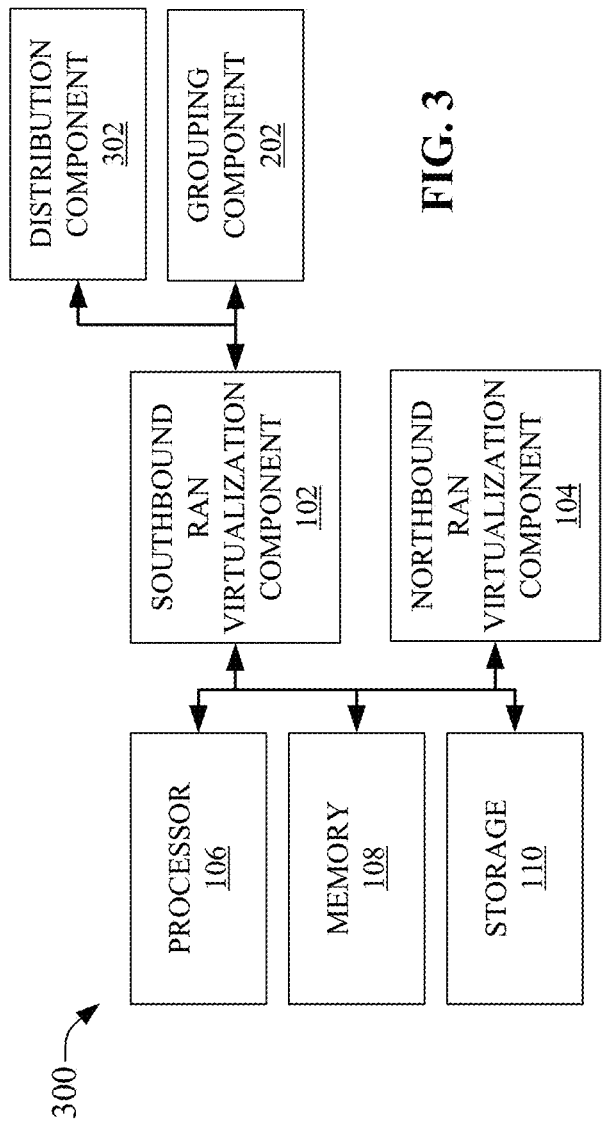
FIG. 3 illustrates a system for virtualizing or abstracting multiple access wireless communication networks/infrastructures in telecommunications environments in accordance with aspects of the subject disclosure.

FIG. 3 provides further detail 300 associated with system 100, wherein system 100, in addition to the above described southbound radio access network virtualization component 102, northbound radio access network virtualization component 104, processor 106, memory 108, storage 110, and grouping component 202, can also include distribution component 302 that can be in operative communication with southbound radio access network visualization component 102. Distribution component 302, in collaboration with southbound radio access network visualization component 102 for instance, collects and distributes radio access network level transmission synchronization timing and parameters, as well as radio access network level quality of service requirements for the disparate user equipment units that exist within the coverage areas of the virtual eNodeB stations.

Figure 4:
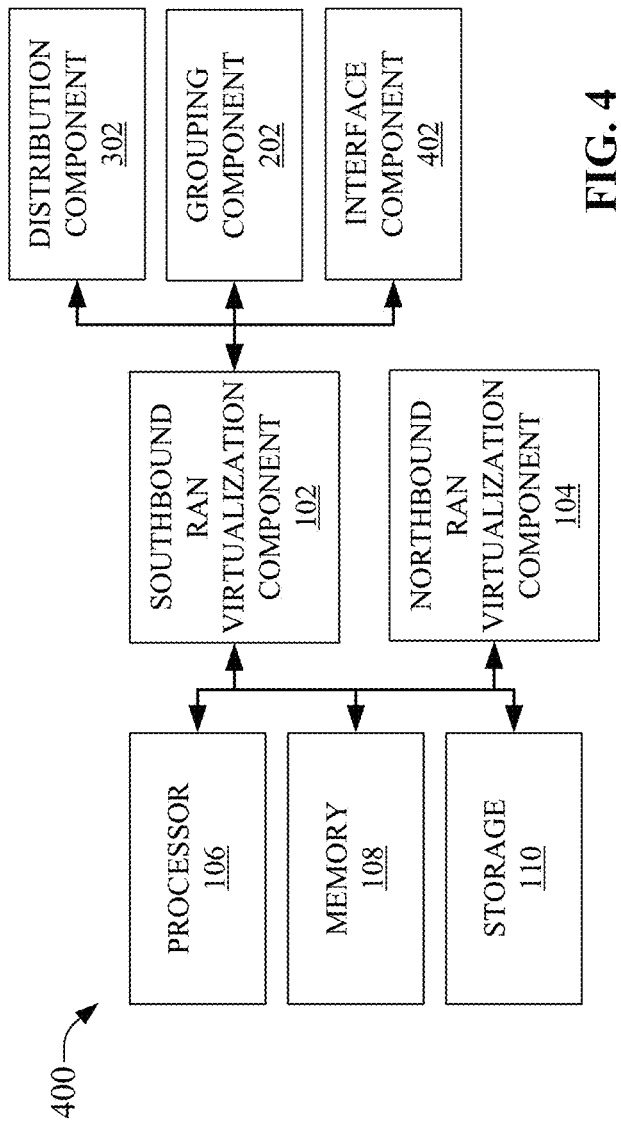
FIG. 4 is still yet a further illustration of a system for virtualizing or abstracting multiple access wireless communication networks/infrastructures in telecommunications environments in accordance with aspects of the subject disclosure FIG. 5 provides another illustration of a system for virtualizing or abstracting multiple access wireless communication networks/infrastructures in telecommunications environments in accordance with aspects of the subject disclosure.

FIG. 4 illustrates further detail 400 associated with system 100, wherein system 100, in addition to the aforementioned southbound radio access network virtualization component 102, northbound radio access network virtualization component 104, processor 106, memory 108, storage 110, grouping component 202, and distribution component 302 that can be in communication with southbound radio access network visualization component 102, can also include interface component 402 that can provide southbound radio access network virtualization component 102 with the facilities to interface with the macro eNodeB station(s) for alignment with virtual eNodeB stations, and where system 100 is in the presence of one or more independent self organized networking servers, provides the southbound radio access network virtualization component 102 the ability to interface with each of these independent self organized networking servers for the purposes of self organized networking base configuration decisions. Additionally, interface component 402 allow southbound radio access network virtualization component 10 to the ability to interface with northbound radio access network virtualization component 104.

Figure 5:
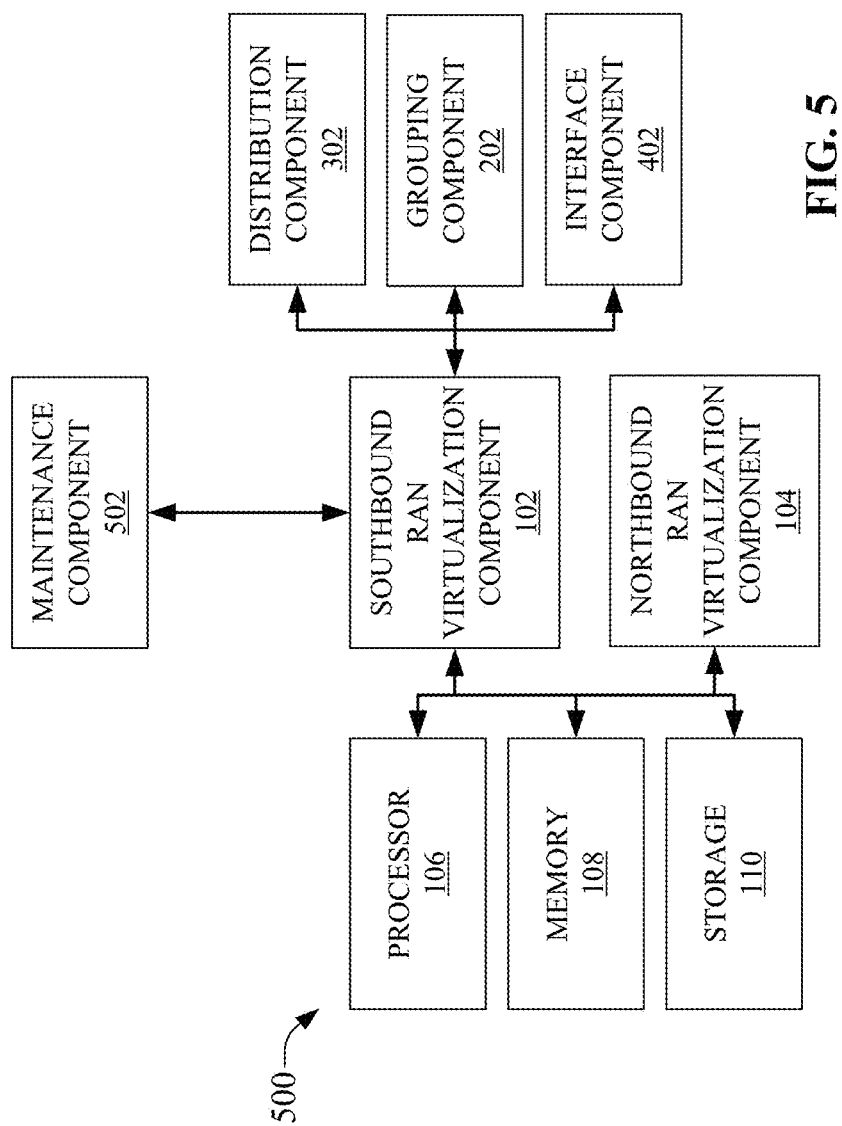

FIG. 5 illustrates further detail 500 associated with system 100, wherein system 100, in addition to the aforementioned southbound radio access network virtualization component 102, northbound radio access network virtualization component 104, processor 106, memory 108, storage 110, grouping component 202, distributed component 302, and interface component 402, can also include maintenance component 502. Maintenance component 502 can perform management and maintenance of virtual eNodeB stations, by distributing software updates, operating system images and system configuration parameters, and/or executing self organized networking algorithms and/or self organized networking processes for radio access network level parameterization of virtual eNodeB stations as well as the macro eNodeB station(s).

Figure 6:
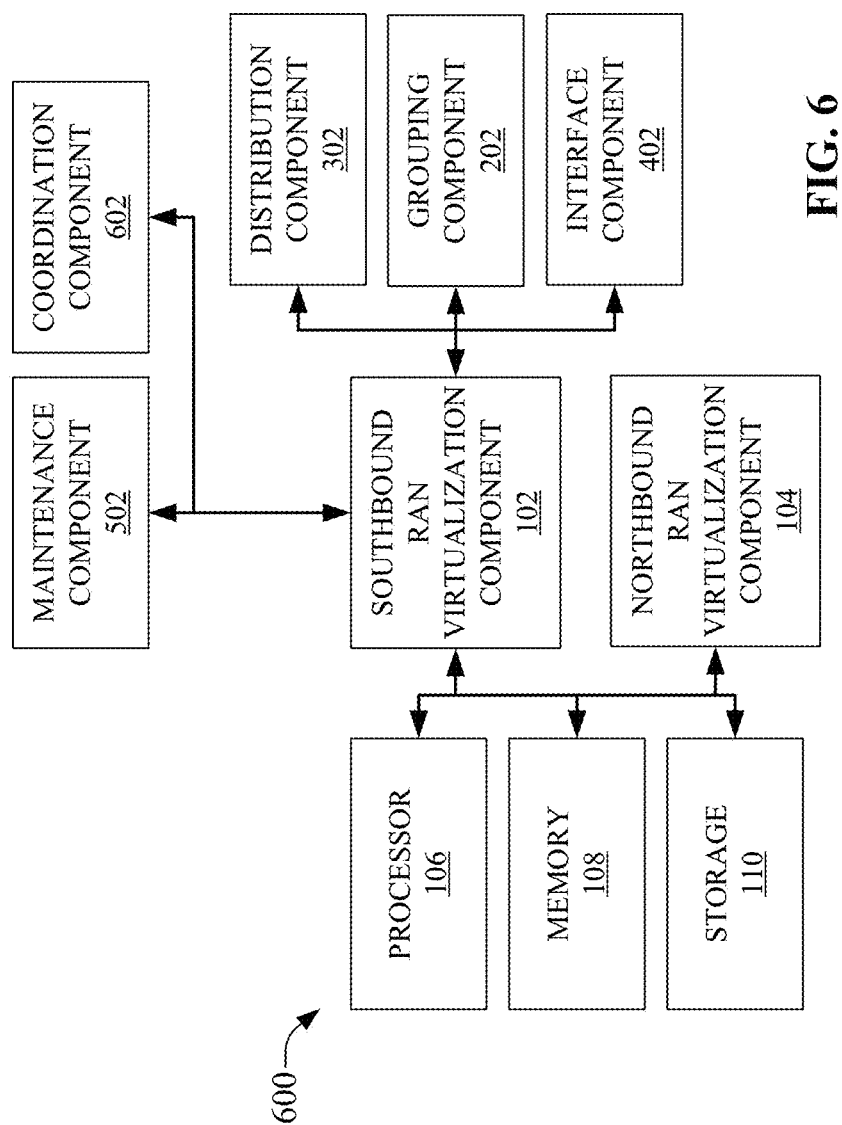
FIG. 6 provides further illustration of a system for virtualizing or abstracting multiple access wireless communication networks/infrastructures in telecommunications environments in accordance with aspects of the subject disclosure.

FIG. 6 illustrates still yet further detail 600 associated with system 100, wherein system 100, in addition to the aforementioned southbound radio access network virtualization component 102, northbound radio access network virtualization component 104, processor 106, memory 108, storage 110, grouping component 202, distribution component 302, interface component 402, and maintenance component 502, can also include coordination component 602. Coordination component 602 can perform coordination among virtual eNodeB stations regarding the adaptive use of different wireless technologies in parallel, such as long term evolution (LTE), Wi-Fi, etc. in such a way that user equipment units only see a single network identifier (e.g. access point name (APN)) across the different wireless technologies. Furthermore, coordination component 602 can ensure that such coordination includes the dynamic use of available spectrum across the available technologies.

Figure 7:
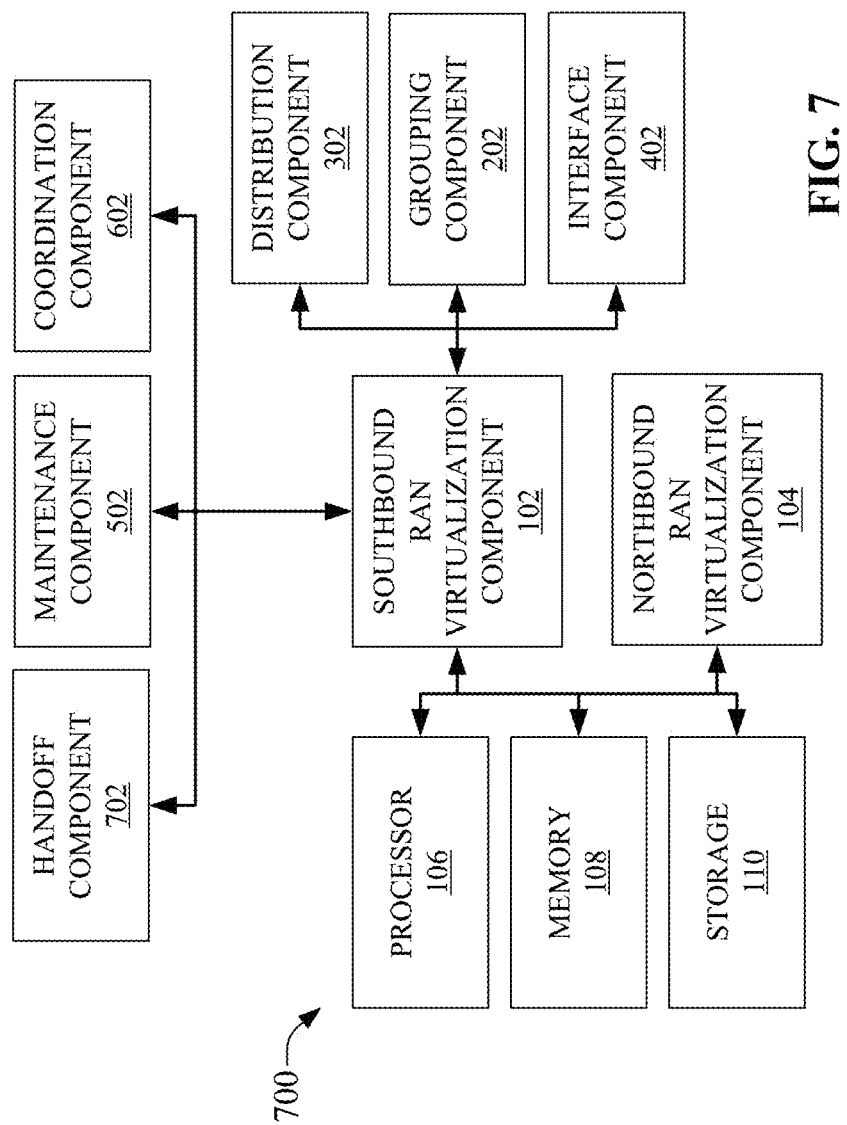
FIG. 7 provides an additional illustration of a system for virtualizing or abstracting multiple access wireless communication networks/infrastructures in telecommunications environments in accordance with aspects of the subject disclosure.

FIG. 7 illustrates still yet further details 700 associated with system 100, wherein in addition to southbound radio access network virtualization component 102, northbound radio access network virtualization component 104, processor 106, memory 108, storage 110, grouping component 202, distribution component 302, interface component 402, maintenance component 502, and coordination component 602, system 100 can include handoff component 702. Handoff component 702 can assist virtual eNodeB stations in performing seamless inter-virtual eNodeB station handoffs for each associated user equipment user extant within the coverage areas of the respective virtual eNodeB stations, and optionally and/or additionally can report handoff related information to northbound radio access network virtualization component 104. With this facility, user equipment units do not perceive that they are being handed off from one virtual eNodeB station to another virtual eNodeB station. Moreover, such a facility allows opportunistic scheduling within the network and minimizes handoff overhead on both the air interface and backend signaling.

Figure 8:
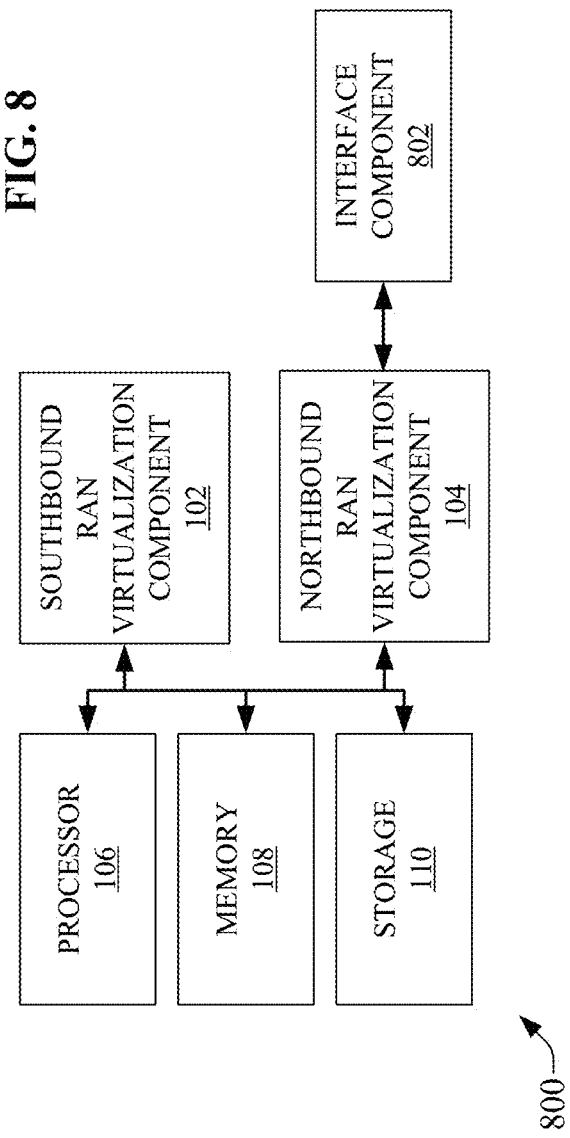
FIG. 8 provides further depiction of a system for virtualizing or abstracting multiple access wireless communication networks/infrastructures in telecommunications environments in accordance with aspects of the subject disclosure.

Turning now to FIG. 8 that provides further detail associated with system 100, and, e.g., from the perspective of northbound radio access network virtualization component 104. In this regard, system 100, in addition to southbound radio access network virtualization component 102, processor 106, memory 108, and storage 110, can include interface component 802 that can be in communication with northbound radio access network virtualization component 104. Interface component 802 can communicate with one or more mobility management entity on behalf of each assigned virtual eNodeB station for paging purposes. For example, interface component 802 on behalf of northbound radio access network virtualization component 104 delivers paging requests to the responsible virtual eNodeB station by maintaining and/or referencing a local map (or table, or other viable data structure) that provides a correlation between cell ID and locally maintained individual identities (L-IDs). Moreover, interface component 802, in concert with northbound radio access network virtualization component 104, responds to the mobility management entity's paging requests based on paging responses that northbound radio access network virtualization component 104 receives from the radio access network. This facility can take place via packet decapsulation (e.g., removing the packet header), wherein system 100 comprising northbound radio access network virtualization component 104 decapsulates the paging response header from the paging response packet sent by a responding virtual eNodeB station, and replaces the paging response header with a header containing the identity of the group in which the virtual eNodeB station is a member (e.g., in this instance, the corresponding macro eNodeB station's cell ID). Additionally and/or alternatively, the responding virtual eNodeB node can directly use the macro eNodeB station cell ID information when constructing the response. Interface component 802, once again in conjunction with northbound radio access network virtualization component 104, can also perform the similar packet processing operations for all related communication between each virtual eNodeB station and the mobility management entity, as well as between each virtual eNodeB station and the serving gateway.

Figure 9:
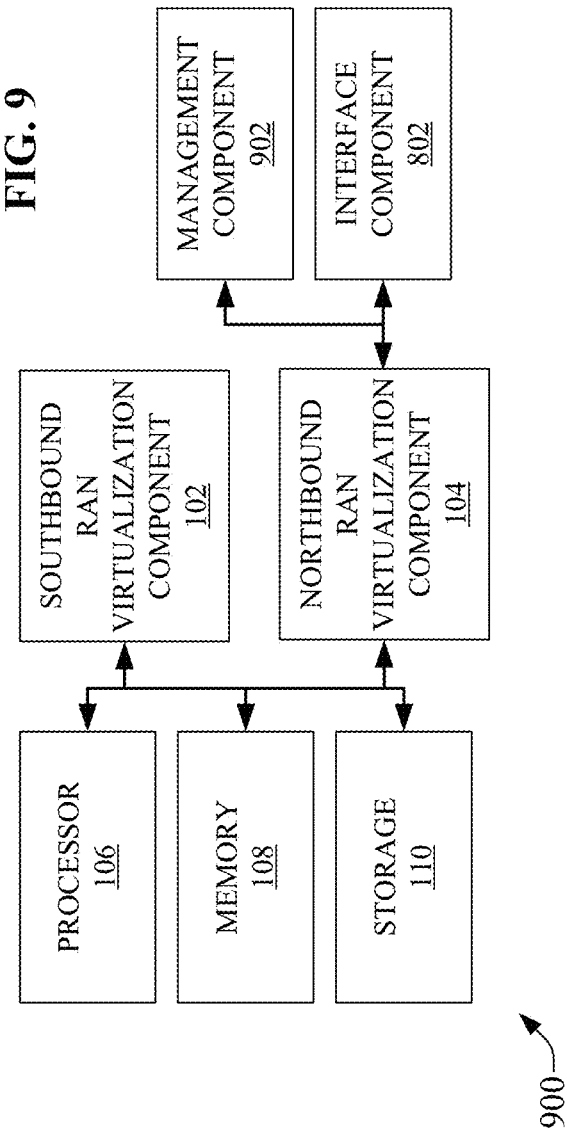
FIG. 9 illustrates a further system that virtualizes or abstracts multiple access wireless communication networks/infrastructures in telecommunications environments in accordance with aspects of the subject disclosure.

FIG. 9 provides further illustration 900 of system 100, wherein system 100 includes previously enunciated southbound radio access network virtualization component 102, processor 106, memory 108, storage 110, and interface component 802. In addition to the foregoing, system 100 can also include management component 902 that can operate in conjunction with northbound radio access network virtualization component 104. Management component 902 can maintain local information regarding the whereabouts of user equipment units that are associated with/to virtual eNodeB stations. Specifically, management component 902 does not share with the mobility management entity any information regarding any inter-virtual eNodeB station handover procedures. As far as the mobility management entity is concerned, a user equipment unit is associated to/with a specific macro cell ID; the mobility management entity does not know the specific identity of the virtual eNodeB station(s) that serve(s) a particular user equipment unit. This information is maintained by management component 902. When the mobility management entity wishes to know the location (in terms of the attached cell) of the user equipment unit, it can send a paging request, which can be handled by northbound radio access network virtualization component 104 and management component 902 in the following manner. Where the information is maintained locally, then northbound radio access network visualization component 104 in collaboration with management component 902 can replace the cell ID (e.g., the macro eNodeB station's cell ID) in the packet header (e.g., for packets that originate at the mobility management entity) with the specific locally maintained individual identity (L-ID). Examples of such packets can include paging requests and authentication and key agreement (AKA) requests/confirmations. Alternatively, where the information is not maintained locally, then northbound radio access network virtualization component 104 in conjunction with management component 902 can multicast the query received from the mobility management entity to all virtual eNodeB stations within the group as well as to the macro eNodeB station.

Figure 10:
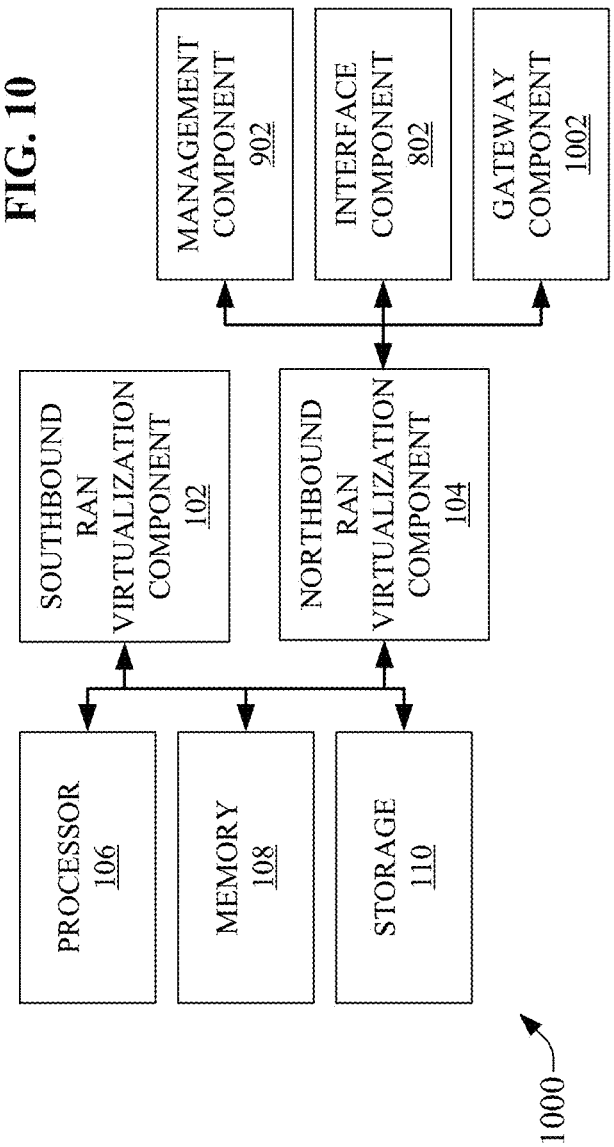
FIG. 10 depicts a further system that virtualizes or abstracts multiple access wireless communication networks/infrastructures in telecommunications environments in accordance with aspects of the subject disclosure.

FIG. 10 provides further detail 1000 in regard to system 100, wherein system 100 can include previously detailed southbound radio access network virtualization component 102, processor 106, memory 108, storage 110, interface component 802, and management component 902. Additionally, system 100 can further include gateway component 1002 that can establish Internet protocol security tunnels (e.g., IPsec tunnels) with each individual virtual eNodeB in conformance with the 3rd Generation Partnership Project technical standards. Additionally and/or alternatively, the internet protocol security tunnels established by gateway component 1002 can be established between each virtual eNodeB station and southbound radio access network virtualization component 102, in which case southbound radio access network virtualization component 102 and northbound radio access network virtualization component 104 (e.g., using gateway component 1002) establishes an individual Internet protocol security tunnel between the two. Other means of security association between southbound radio access network virtualization component 102 and northbound radio access network virtualization component 104, using gateway component 1002 can include pre-provisioned key material based mutual authentication, certificate-based protocols, identity-based authentication key agreement, and the like.

It should be noted that in the presence of southbound radio access network virtualization component 102, all evolved packet core related information is exchanged between southbound radio access network virtualization component 102 and northbound radio access network virtualization component 104. Depending on the implementation, the two components (e.g., southbound radio access network virtualization component 102 and northbound radio access network virtualization component 104) can coexist within system 100 or southbound radio access network virtualization component 102 and northbound radio access network virtualization component 104 can operate on disparate servers or systems. It is also possible to implement southbound radio access network virtualization component 102 and northbound radio access network virtualization component 104 in a software package comprising executable instructions that can be executed by a processor 106, and that can be stored in either memory 108 and/or storage 110.

Figure 11:
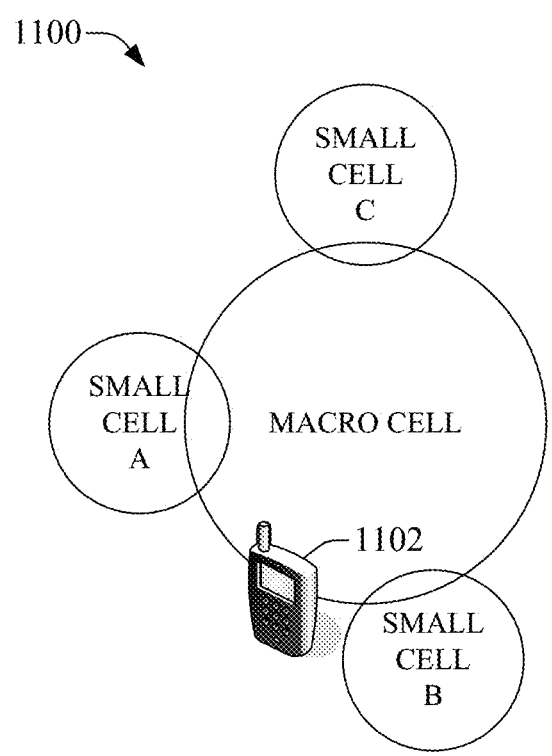
FIG. 11 depicts an illustrative deployment of small cells into the coverage area of a macro cell.

FIG. 11 depicts an illustrative deployment of small cells (e.g., small cell eNodeB stations; small cell A, small cell B, and small cell C) into the coverage area of a macro cell (e.g., a macro cell eNodeB station). As illustrated, three small cell eNodeB stations (e.g., small cell A, small cell B, and small cell C) have been introduced or deployed into the coverage area of a macro cell. The introduction of the small cell eNodeB stations can cause significant levels of interference between user equipment units in communication with the macro cell eNodeB station and user equipment units that are in communication with the one or more the small cell eNodeB stations positioned or located within the coverage range of the macro cell eNodeB station. This interference can be exacerbated when the macro cell eNodeB station schedules a transmission toward an associated user equipment unit while a deployed small cell eNodeB station simultaneously schedules a transmission towards its associated user equipment unit. Given that the two transmissions are scheduled to take place at the same time the respective user equipment units can therefore experience significantly higher levels of interference. In other words, the Signal to Interference plus Noise Ratio (SINR) at both the user equipment unit associated with the macro eNodeB station and the user equipment unit associated with the small cell eNodeB station are both significantly degraded due to the concurrent transmissions of the macro eNodeB station and the small cell eNodeB station. As has been noted above, this degradation is mainly due to the fact that in long term evolution radio access network deployments, eNodeB stations do not typically synchronize their transmissions; each base station (e.g. macro cell eNodeB station and/or small cell eNodeB stations) schedule transmissions to their associated user equipment units independently of one another, and rely on physical layer techniques as well as self optimization/organization networking algorithms and/or self optimization/organization networking processes to mitigate interference.

Figure 12:
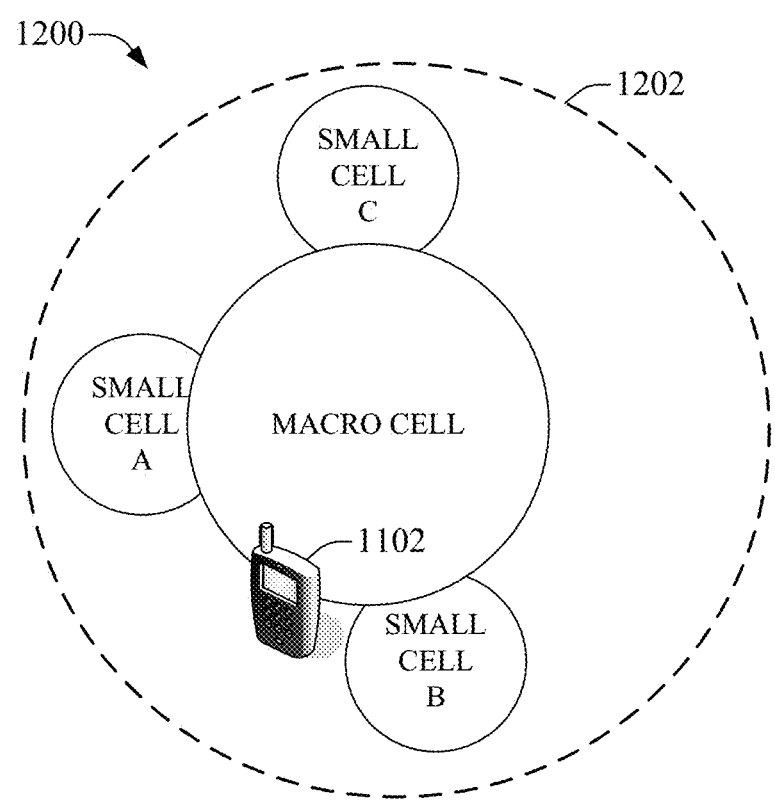
FIG. 12 depicts a further deployment of small cells into the coverage area of a macro cell in accordance with the subject disclosure.

FIG. 12 depicts a further deployment of small cells (e.g., small cell eNodeB stations; small cell A, small cell B, and small cell C) into the coverage area of a macro cell (e.g., a macro cell eNodeB station) in accordance with the subject disclosure. In this instance a virtual eNodeB station 1202 has been constructed, wherein the small cells (e.g., small cell A, small cell B, and small cell C) and a macro cell are combined to form virtual eNodeB station 1202. Under this conception each deployed small cell is seamlessly integrated within the distinct macro cell deployment. As a result, the radio access network still consists of the same cell identities that were present prior to the small cell deployments, since each established virtual eNodeB station (e.g., 1202) utilizes, for example, the cell ID of the macro eNodeB station to communicate with the radio access network, but within the virtual eNodeB station grouping (e.g., comprising the macro cell eNodeB station and small cell eNodeB station deployments small cell A, small cell B, and small cell C) the small cell eNodeB stations and the macro cell eNodeB station can distinguish among themselves through use of locally maintained individual identities (L-IDs). It should be appreciated that while these locally maintained individual identities are used among the small cell eNodeB stations (as well as by the macro eNodeB station), these identities are not exposed over the air face to the user equipment units, and are not propagated to mobility management entities or the serving gateway.

Figure 13:
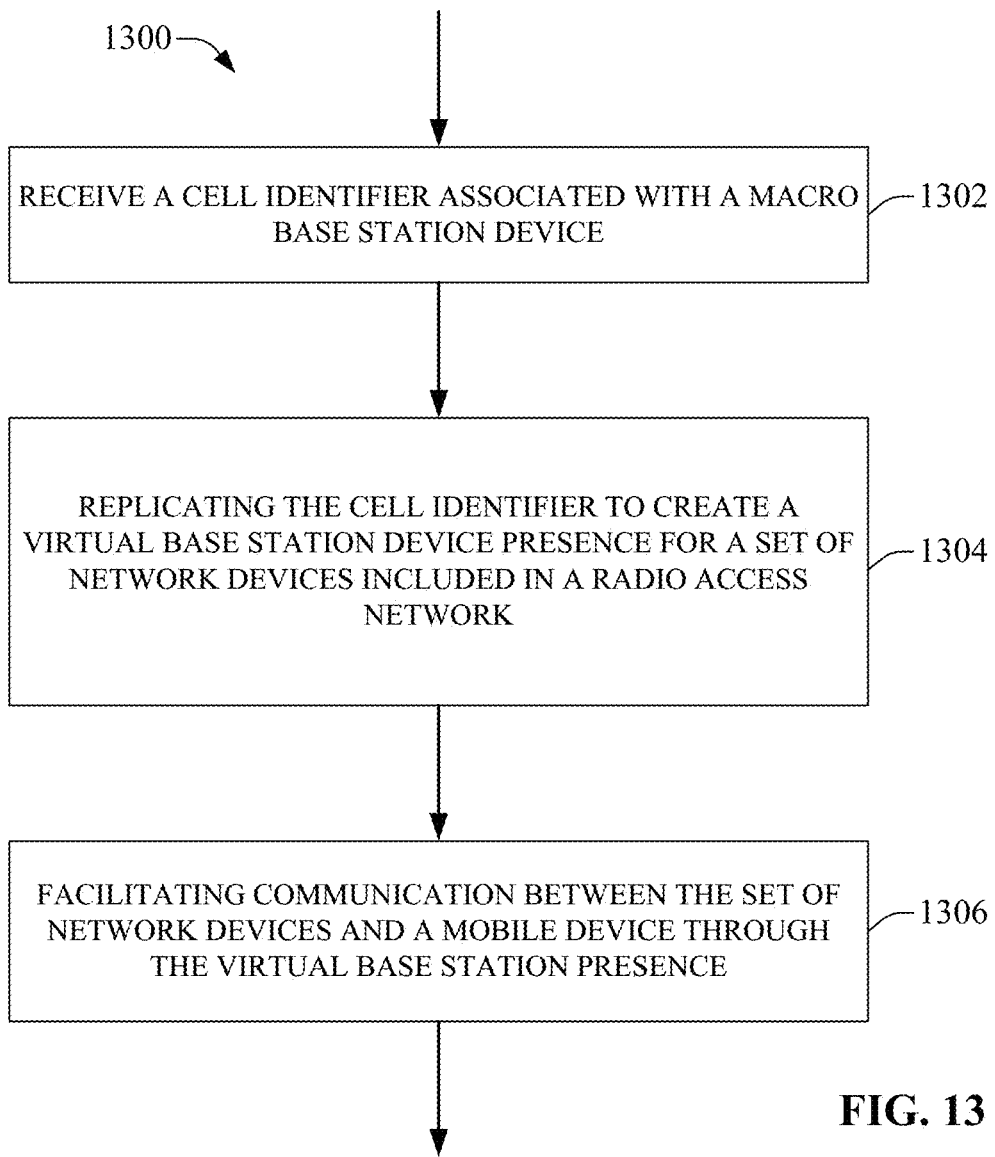
FIG. 13 illustrates a method for virtualizing or abstracting multiple access wireless communication networks/infrastructures in telecommunications environments in accordance with aspects of the subject disclosure.

In view of the example system(s) described above, example method(s) that can be implemented in accordance with the disclosed subject matter can be better appreciated with reference to flowchart in FIG. 13. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 13 illustrates a method 1300 for virtualizing or abstracting multiple access wireless communication networks/infrastructures in long term evolution (LTE) telecommunications environments. Method 1300 can commence at 1302 where a cell identifier associated with a macro base station device (e.g. macro eNodeB station) can be received. At 1304 the cell identifier associated with the macro base station device can be replicated in order to create a virtual base station device presence for a set of network devices included in a radio access network. At 1306 communication between the set of network devices and a mobile device (e.g., user equipment unit) can be facilitated through the virtual base station device presence.

Figure 14:
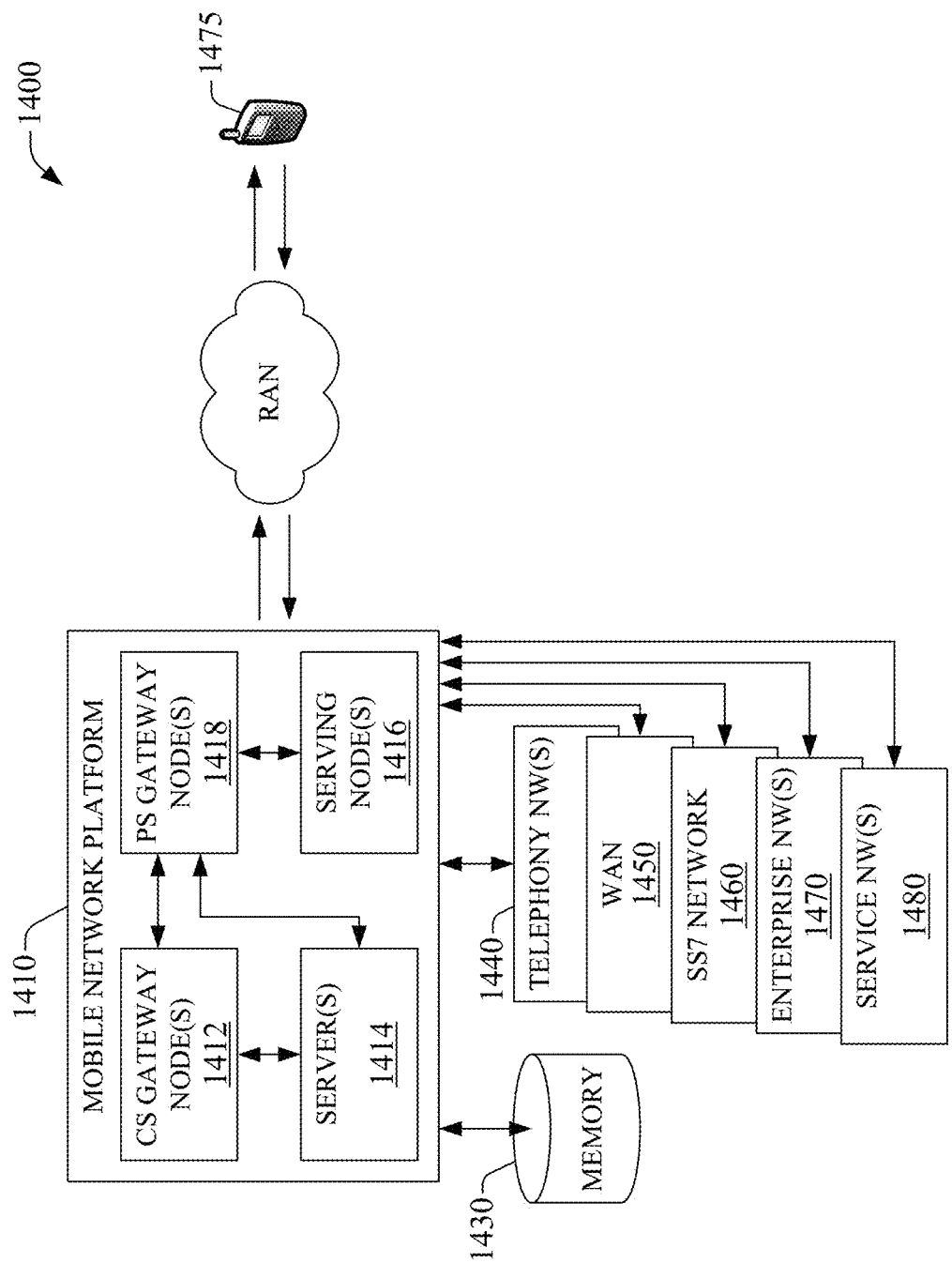
FIG. 14 is a block diagram of an example embodiment of a mobile network platform to implement and exploit various features or aspects of the subject disclosure.

FIG. 14 presents an example embodiment 1400 of a mobile network platform 1410 that can implement and exploit one or more aspects of the disclosed subject matter described herein. Generally, wireless network platform 1410 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1410 can be included in telecommunications carrier networks, and can be considered carrier-side components as discussed elsewhere herein. Mobile network platform 1410 includes CS gateway node(s) 1412 which can interface CS traffic received from legacy networks like telephony network(s) 1440 (e.g., public switched telephone network (PSTN), or public land mobile network (PLMN)) or a signaling system #7 (SS7) network 1470. Circuit switched gateway node(s) 1412 can authorize and authenticate traffic (e.g., voice) arising from such networks. Additionally, CS gateway node(s) 1412 can access mobility, or roaming, data generated through SS7 network 1470; for instance, mobility data stored in a visited location register (VLR), which can reside in memory 1430. Moreover, CS gateway node(s) 1412 interfaces CS-based traffic and signaling and PS gateway node(s) 1418. As an example, in a 3GPP UMTS network, CS gateway node(s) 1412 can be realized at least in part in gateway GPRS support node(s) (GGSN). It should be appreciated that functionality and specific operation of CS gateway node(s) 1412, PS gateway node(s) 1418, and serving node(s) 1416, is provided and dictated by radio technology(ies) utilized by mobile network platform 1410 for telecommunication.

In addition to receiving and processing CS-switched traffic and signaling, PS gateway node(s) 1418 can authorize and authenticate PS-based data sessions with served mobile devices. Data sessions can include traffic, or content(s), exchanged with networks external to the wireless network platform 1410, like wide area network(s) (WANs) 1450, enterprise network(s) 1470, and service network(s) 1480, which can be embodied in local area network(s) (LANs), can also be interfaced with mobile network platform 1410 through PS gateway node(s) 1418. It is to be noted that WANs 1450 and enterprise network(s) 1460 can embody, at least in part, a service network(s) like IP multimedia subsystem (IMS). Based on radio technology layer(s) available in technology resource(s) 1417, packet-switched gateway node(s) 1418 can generate packet data protocol contexts when a data session is established; other data structures that facilitate routing of packetized data also can be generated. To that end, in an aspect, PS gateway node(s) 1418 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1400, wireless network platform 1410 also includes serving node(s) 1416 that, based upon available radio technology layer(s) within technology resource(s) 1417, convey the various packetized flows of data streams received through PS gateway node(s) 1418. It is to be noted that for technology resource(s) 1417 that rely primarily on CS communication, server node(s) can deliver traffic without reliance on PS gateway node(s) 1418; for example, server node(s) can embody at least in part a mobile switching center. As an example, in a 3GPP UMTS network, serving node(s) 1416 can be embodied in serving GPRS support node(s) (SGSN).

For radio technologies that exploit packetized communication, server(s) 1414 in wireless network platform 1410 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1410. Data streams (e.g., content(s) that are part of a voice call or data session) can be conveyed to PS gateway node(s) 1418 for authorization/authentication and initiation of a data session, and to serving node(s) 1416 for communication thereafter. In addition to application server, server(s) 1414 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1410 to ensure network's operation and data integrity in addition to authorization and authentication procedures that CS gateway node(s) 1412 and PS gateway node(s) 1418 can enact. Moreover, provisioning server(s) can provision services from external network(s) like networks operated by a disparate service provider; for instance, WAN 1450 or Global Positioning System (GPS) network(s) (not shown). Provisioning server(s) can also provision coverage through networks associated to wireless network platform 1410 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1475.

It is to be noted that server(s) 1414 can include one or more processors configured to confer at least in part the functionality of macro network platform 1410. To that end, the one or more processor can execute code instructions stored in memory 1430, for example. It is should be appreciated that server(s) 1414 can include a content manager 1415, which operates in substantially the same manner as described hereinbefore.

In example embodiment 1400, memory 1430 can store information related to operation of wireless network platform 1410. Other operational information can include provisioning information of mobile devices served through wireless platform network 1410, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1430 can also store information from at least one of telephony network(s) 1440, WAN 1450, enterprise network(s) 1460, or SS7 network 1470. In an aspect, memory 1430 can be, for example, accessed as part of a data store component or as a remotely connected memory store.

Figure 15:
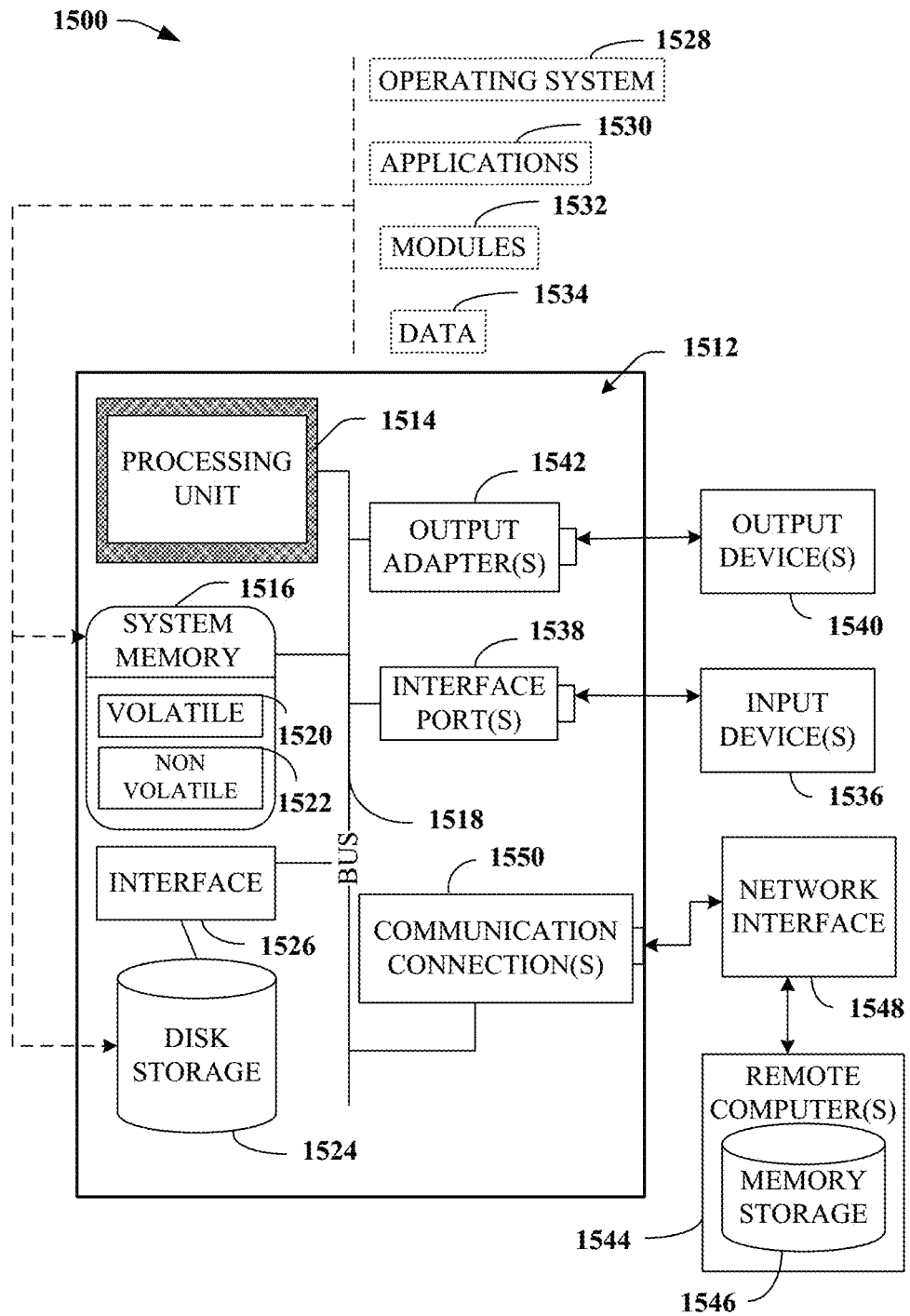
FIG. 15 illustrates a block diagram of a computing system operable to execute the disclosed systems and methods in accordance with an embodiment.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1520 (see below), non-volatile memory 1522 (see below), disk storage 1524 (see below), and memory storage 1546 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 15 illustrates a block diagram of a computing system 1500 operable to execute the disclosed systems and methods in accordance with an embodiment. Computer 1512, which can be, for example, part of the hardware of an operating support system 102 or user equipment, includes a processing unit 1514, a system memory 1516, and a system bus 1518. System bus 1518 couples system components including, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1516 can include volatile memory 1520 and nonvolatile memory 1522. A basic input/output system (BIOS), containing routines to transfer information between elements within computer 1512, such as during start-up, can be stored in nonvolatile memory 1522. By way of illustration, and not limitation, nonvolatile memory 1522 can include ROM, PROM, EPROM, EEPROM, or flash memory. Volatile memory 1520 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 can also include removable/non-removable, volatile/non-volatile computer storage media. FIG. 15 illustrates, for example, disk storage 1524. Disk storage 1524 includes, but is not limited to, devices like a magnetic disk drive, floppy disk drive, tape drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 15 describes software that acts as an intermediary between users and computer resources described in suitable operating environment 1500. Such software includes an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be noted that the disclosed subject matter can be implemented with various operating systems or combinations of operating systems.

A user can enter commands or information into computer 1512 through input device(s) 1536. As an example, operations support system 102 can include a user interface embodied in a touch sensitive display panel allowing a user to interact with computer 1512. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1514 through system bus 1518 by way of interface port(s) 1538. Interface port(s) 1538 include, for example, a serial port, a parallel port, a game port, a universal serial bus (USB), an infrared port, a Bluetooth port, an IP port, or a logical port associated with a wireless service, etc. Output device(s) 1540 use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540 like monitors, speakers, and printers, among other output devices 1540, which use special adapters. Output adapters 1542 include, by way of illustration and not limitation, video and sound cards that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, cloud storage, cloud service, a workstation, a microprocessor based appliance, a peer device, or other common network node and the like, and typically includes many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically connected by way of communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving a cell identifier representative of a base station device;
   employing the cell identifier to create data representing a device object for devices associated with a network;
   in response to receiving, from a device of the devices, a paging request comprising header data, replacing the header data with substitute header data comprising the data representing the device object; and
   facilitating a communication between the device and the devices based on the data.

2. The system of claim 1, wherein the device object is a first device object, wherein the operations further comprise maintaining a data structure of identities to distinguish the first device object from a second device object, and wherein the data structure of identities comprises a media access control address of a network interface associated with the first device object.

3. The system of claim 1, wherein the device object is a first device object, wherein the data is first data, and wherein the operations further comprise, as a function of the cell identifier, grouping the first data representing the first device object with second data representing a second device object.

4. The system of claim 1, wherein the network is a radio access network, and wherein the operations further comprise initiating sending of a transmission parameter of the radio access network to the device object.

5. The system of claim 1, wherein the network is a radio access network, and wherein the operations further comprise initiating sending, to the devices of the radio access network, a quality of service request for the device to the device object.

6. The system of claim 1, wherein the operations further comprise initiating sending of a software update to the device object.

7. The system of claim 1, wherein the operations further comprise initiating sending of an operating system image or a system configuration parameter to the device object.

8. The system claim 1, wherein the operations further comprise executing a self organized networking process for a parameterization of the device object for the network.

9. The system of claim 1, wherein the device object is a first device object, and wherein the operations further comprise coordinating use of different wireless technologies between the first device object and a second device object to associate the device with a single network identifier.

10. A method, comprising:
    receiving, by a system comprising a processor, a cell identifier representing a base station device;
    replicating, by the system, the cell identifier to create data representing a device object for devices associated with a network;
    in response to receiving, from a device of the devices, a paging request replacing, by the system, header data included in the paging request with substitute header data comprising the data; and
    facilitating, by the system, a communication between the device and devices associated with the network the based on the data.

11. The method of claim 10, wherein the paging request is a first paging request, and further comprising, as a function of a data structure of identities, transmitting, by the system, a second paging request received from a mobility management entity device to the device object.

12. The method of claim 11, further comprising, as a function of a paging response received from the device of the devices associated with the network, transmitting a response, by the system, to the second paging request received from the mobility management entity device.

13. A non-transitory machine-readable storage medium, comprising executable instructions that, when executed by a processor, facilitate performance of operations, comprising:
in response to receiving, from a network device of a network of network devices, a paging request comprising header data, replacing the header data with substitute header data comprising data representative of a device object for the network devices according to a received cell identifier representing a base station device, wherein the received cell identifier is received from the base station device; and
facilitating communication between the network device and the network devices based on the data.

14. The non-transitory machine-readable storage medium of claim 13, wherein the operations further comprise maintaining a data structure of identities comprising a media access control address of a network interface associated with the device object.

15. The non-transitory machine-readable storage medium of claim 13, wherein the network is a radio access network, and wherein the operations further comprise transmitting a transmission synchronization timing value of the radio access network to the device object.

16. The non-transitory machine-readable storage medium of claim 13, wherein the network is a radio access network, and wherein the operations further comprise transmitting a quality of service requirement for the radio access network and associated with the network device to the device object.

17. The non-transitory machine-readable storage medium of claim 13, wherein the operations further comprise transmitting a software update to the device object.

18. The non-transitory machine-readable storage medium of claim 13, wherein the operations further comprise initiating a self organized networking process for a parameterization of the network devices of the network.

19. The non-transitory machine-readable storage medium of claim 13, wherein the device object is a first device object, wherein the paging request is a first paging request, and wherein the operations further comprise transmitting a second paging request received from a mobility management entity device to the device object as a function of a data structure of identities that distinguishes the first device object from a second device object.

20. The non-transitory machine-readable storage medium of claim 13, wherein the paging request is a first paging request, and wherein the operations further comprise, as a function of a paging response received from the network device, transmitting a reply comprising a second paging request received from a mobility management entity device.

* * * * *